United States Patent [19]

Kreitner

[11] 4,119,355
[45] Oct. 10, 1978

[54] AUXILIARY RELEASE APPARATUS FOR A HYDRAULIC PRESSURE RELEASABLE BRAKE

[75] Inventor: Charles A. Kreitner, Benton Harbor, Mich.

[73] Assignee: Lambert Brake Corporation, St. Joseph, Mich.

[21] Appl. No.: 827,896

[22] Filed: Aug. 26, 1977

[51] Int. Cl.² .................................................. B60T 15/16
[52] U.S. Cl. ........................................ 303/85; 303/13; 303/71
[58] Field of Search ................ 303/13, 14, 71, 80, 303/85; 188/170

[56] References Cited
U.S. PATENT DOCUMENTS

| 3,272,566 | 9/1966 | Clack | 188/170 X |
| 3,279,865 | 10/1966 | Bohn | 303/85 X |
| 3,314,438 | 4/1967 | Ike | 303/85 X |
| 3,385,636 | 5/1968 | Cruse | 303/85 X |

Primary Examiner—Duane A. Reger
Attorney, Agent, or Firm—Olson, Trexler, Wolters, Bushnell & Fosse, Ltd.

[57] ABSTRACT

An auxiliary release apparatus for use with a hydraulic pressure releasable brake having a principal source of hydraulic pressure comprises an auxiliary source of hydraulic pressure selectively connectable to the brake for releasing the brake when the principal source of hydraulic pressure is not operating. The auxiliary release apparatus includes a shuttle valve and a relief valve for automatically disconnecting the auxiliary source and reconnecting the principal source of hydraulic pressure from the brake when the principal source of hydraulic pressure is operating. The auxiliary source of hydraulic pressure includes a cylinder, a hand pump comprising a handle and a piston connected to the handle and disposed in the cylinder, a fluid supply reservoir and suitable connection lines between the fluid supply and the cylinder. The relief valve also regulates the amount of pressure provided to the brake by the hand pump.

10 Claims, 4 Drawing Figures

AUXILIARY RELEASE APPARATUS FOR A HYDRAULIC PRESSURE RELEASABLE BRAKE

BACKGROUND OF THE INVENTION

This invention relates generally to hydraulic pressure devices and more particularly to a hydraulic pressure device adapted for use as an auxiliary release apparatus for a hydraulic pressure releasable brake having a principal source of hydraulic pressure when the principal source of pressure is not operating.

A normally engaged brake that is released or disengaged by hydraulic pressure comprises a simple and practical means for providing an emergency or parking brake that is energized in the event of hydraulic failure or shut-down. Thus, by relieving the hydraulic pressure to the brake, a driven or otherwise rotating member can be held in a fixed position. This type of brake has a wide range of application as for example between a hydraulic motor and a gearbox. Additionally, such a brake may be suspended or hung from the end of a hydraulic motor or other source of power, or may be used in vehicle power trains, machine tools, cable wheels, servo mechanism applications and generally as a brake on any rotating shaft. Such a normally engaged brake that is disengageable by hydraulic pressure is disclosed in U.S. Pat. No. 3,863,038 to Kreitner et al, the disclosure of which is incorporated herein by reference, and need not be described in detail.

In a system using such a brake, when a failure occurs in the hydraulic system connected to the brake, the brake is automatically applied and thus, the shaft to which the brake is attached cannot be rotated until hydraulic pressure is once again restored. In many cases, it will be desirable to release the brake by use of an auxiliary source of pressure before the principal source of hydraulic pressure is returned to operation. For example, should the hydraulic failure occur in a vehicle equipped with such a brake, it would be desirable to release the brake so that the vehicle could be towed or pushed from the area where the failure occured to an appropriate area to repair the hydraulic system.

Prior to the present invention, a simple hand pump was suggested to release the brake in such cases, however, this approach creates at least two major problems. Firstly, hand pumps typically have a pressure rating of from 7,000 to 10,000 psi. Therefore, without a pressure gauge in the hand pump line, it is possible to exceed the pressure rating of the bake which is typically on the order of 3,000 psi. Moreover, pressures on the order of 7,000 to 10,000 psi are capable of doing permanent damage to the internal components of the brake. Secondly, the pressure applied to the brake by the hand pump must be manually released after the primary or principal source of hydraulic pressure is restored. If release of the auxiliary pressure is overlooked, the main safety feature of the brake will obviously be lost, since with the auxiliary pressure still present, the brake will not engage at all.

OBJECTS AND SUMMARY OF THE INVENTION

It is an object of the present invention to provide a novel auxiliary release apparatus for a normally engaged hydraulic pressure releasable brake.

Another object of the present invention is to provide an auxiliary release apparatus including an auxiliary source of hydraulic pressure and means for automatically disconnecting the auxiliary source from the brake when the principal source of pressure is operating.

Still another object of the present invention is to provide an auxiliary brake release apparatus, in accordance with the foregoing objects, which further includes means for relieving the auxiliary source of pressure at a point well below the pressure rating of the brake.

Yet another object of the present invention is to provide an auxiliary brake release apparatus, in accordance with the foregioing objects, which is adapted to function as a permanent part of a hydraulic brake release system without modifications thereto with the exception of providing suitable connecting lines.

It is a further object of the present invention to provide an auxiliary brake release apparatus, in accordance with the foregoing objects, which is of relatively compact dimension and is relatively simple to connect to a hydraulic system, so that it may be used as a portable unit to be connected as needed to a hydraulic brake release system, and readily disconnected when required for use with another smilar hydraulic brake release system.

Briefly, an auxiliary release apparatus in accordance with the present invention comprises an auxiliary source of hydraulic pressure, means for selectively connecting the auxiliary source to the brake for releasing the brake when its principal source of pressure is not operating and means for automatically disconnecting the auxiliary source from the brake when its principal source of pressure is operating.

The auxiliary source of hydraulic pressure comprises a hand-operable pump including a cylinder or pump chamber, a handle and a piston driven by the handle and disposed for reciprocal motion in the cylinder or chamber. A fluid supply or reservoir is provided including a connecting line to the auxiliary brake release apparatus and is selectively connectable to the pump chamber by a suitable valve such as a spring loaded ball check. A second spring loaded ball check is provided to selectively connect the pump chamber on its side opposite the reservoir inlet to a second chamber. A first relief chamber is selectively connectable to the second chamber by a ball valve which is urged against a connecting port between the first relief chamber and second chamber by a spring loaded piston. The first relief chamber is also connected to a return line to the fluid reservoir. A second relief chamber is provided at an upper portion of the spring loaded piston including a passageway or connection to the principal source of hydraulic pressure. A shuttle valve is connected between the aforementioned second chamber and a passageway to the principal source of hydraulic pressure. The shuttle valve is also provided with a port connected to the inlet of the brake so that the shuttle valve selectively connects either the hand pump or the principal source of hydraulic pressure to the brake.

The foregoing, as well as other objects and advantages of the present invention will become readily apparent from the following detailed description together with the accompanying drawings wherein the same reference numerals are intended to designate the same parts and components throughout the various figures.

DETAILED DESCRIPTION

Figure 1:
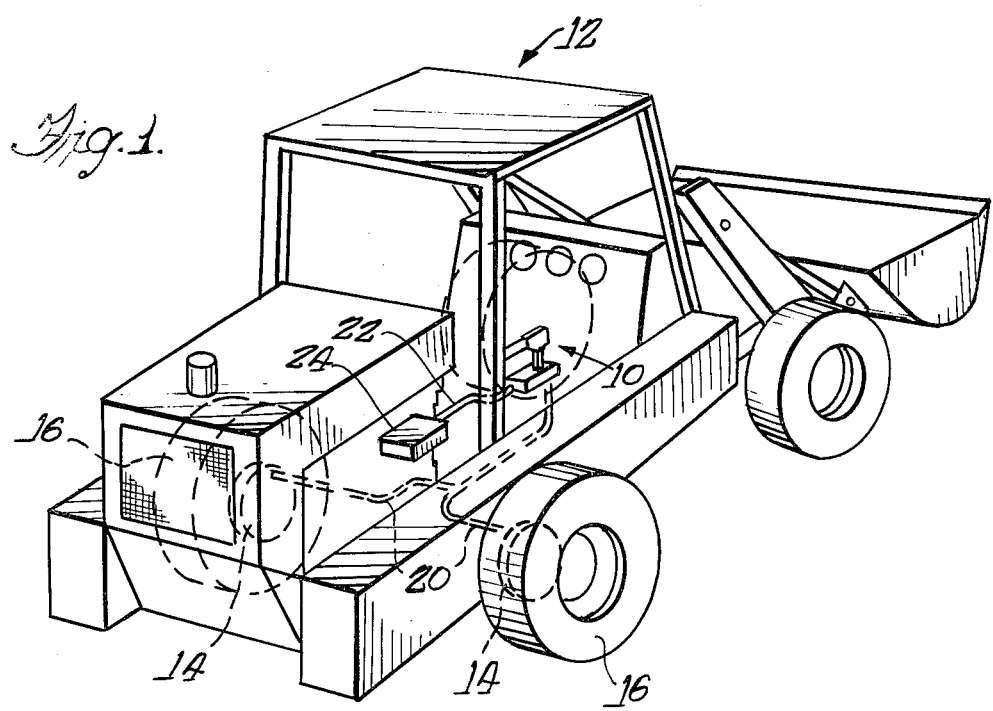
FIG. 1 is a perspective view of an industrial vehicle equipped with a hydraulic pressure releasable brake and an auxiliary brake release apparatus in accordance with the present invention.

Referring now to FIG. 1, an auxiliary brake release apparatus 10 is shown in use with an industrial type vehicle 12. Normally engaged hydraulic pressure releasable brakes 14 are provided for the wheels 16 of the vehicle 12. Fluid lines 20 connect the brakes 14 to the auxiliary brake release apparatus 10 and fluid line 22 connects the apparatus 10 to a principal source of hydraulic pressure or pump 24 on the vehicle 12. In normal operation, as will be described in detail below, the principal source of hydraulic pressure 24 is connected by the apparatus 10 from line 22 directly to brake lines 20. The brakes 14 are normally engaged to prevent rotation of the wheels 16 until released by hydraulic pressure. These brakes are preferably of the type described in U.S. Pat. No. 3,863,038 to Kreitner et al referred to hereinabove.

In normal operation, when the vehicle 12 has its motor turned on, the principal source of hydraulic pressure 24 will be activated providing hydraulic pressure over lines 22 and 20 to the brakes 14 to release the brakes and allow wheels 16 to rotate freely. When the vehicle is parked, the hydraulic pressure source or pump 24 is cut off by the truck operator to cause the brakes 14 to engage. The brakes 14 also will engage should there be any failure in the principal source of hydraulic pressure 24 or in the line 22 thus removing pressure from the brakes 14.

The present invention is intended to be used in conjunction with the type of brakes described above and in the United States patent referred to above. It is apparent therefore that the range of applications of the apparatus of the present invention is as wide as the range of applications of the brakes with which it is intended to be used. The above example of an industrial type vehicle, therefore, is given as an illustrative example of the operation of the apparatus of the present invention and is not intended to limit the invention thereto.

Figure 2:
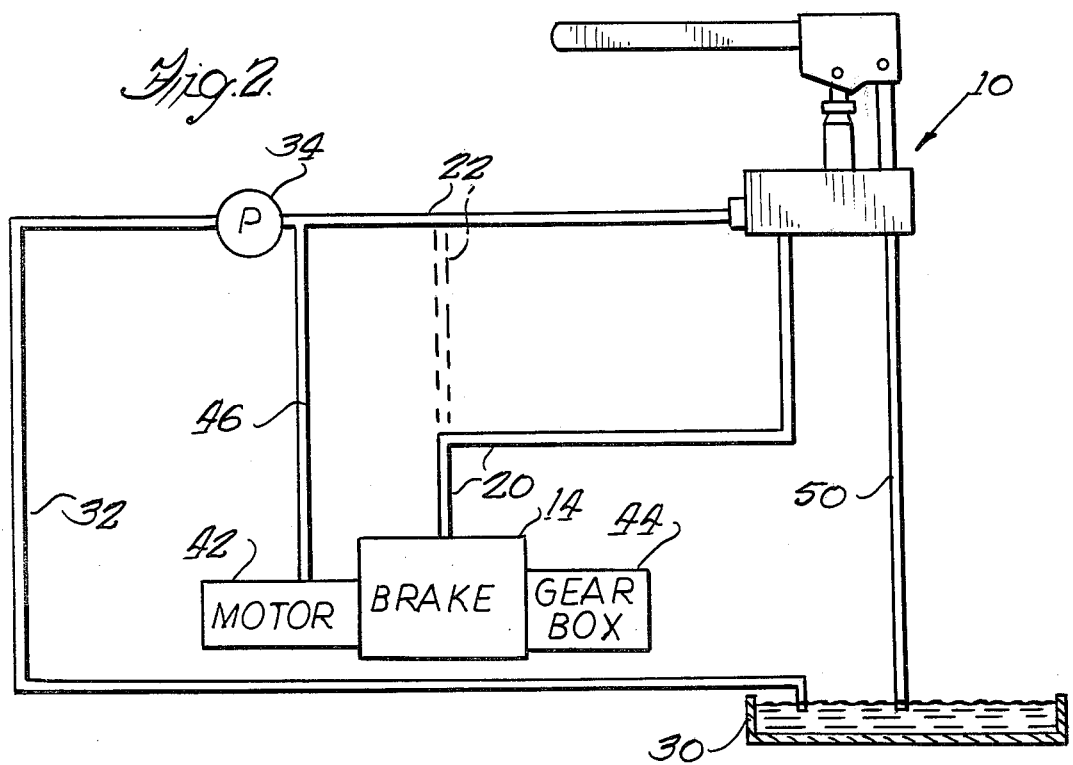
FIG. 2 is a schematic diagram of a hydraulic brake circuit including an auxiliary brake release apparatus in accordance with the present invention.

Attention is now directed to FIG. 2, which shows schematically, an apparatus 10 according to the present invention connected in a hydraulic circuit. The hydraulic circuit includes a fluid reservoir 30 connected by a fluid line 32 to a principal source of hydraulic pressure such as a hydraulic pump 34. The hydraulic pump 34 is connected by line 22, and line 20 to a brake 14 of the type described hereinabove. The brake 14 may be attached to a vehicle wheel as in FIG. 1 above or may alternatively be connected to a shaft (not shown) between a motor 42 and a gear box 44 comprising a power train for use in a wide range of applications. The motor 42 may be a hydraulic drive motor connected by a fluid line 46 to the line 22 from the pump 34. The auxiliary brake release apparatus 10 is connected in the hydraulic system by fluid carrying line 22 which is connected to the pump 34, and by fluid carrying line 20 which is connected to the brake 14. The auxiliary release apparatus 10 is also provided with a line 50 to the fluid reservoir 30.

It will become readily apparent from the foregoing description that the auxiliary release apparatus 10 may be easily connected in the existing hydraulic system simply by disconnecting the dotted portion of the line 22 from the line 20 and reconnecting the line 22 to the apparatus 10, by connecting the line 20 from the brake 14 directly to the apparatus 10, and by providing the line 50 to the fluid reservoir 30. Thus, in normal operation, hydraulic fluid under pressure will flow through line 22 to the auxiliary release apparatus 10 and, in a manner to be described in detail below, through the apparatus 10 into line 20 and thus to brake 14.

Figure 3:
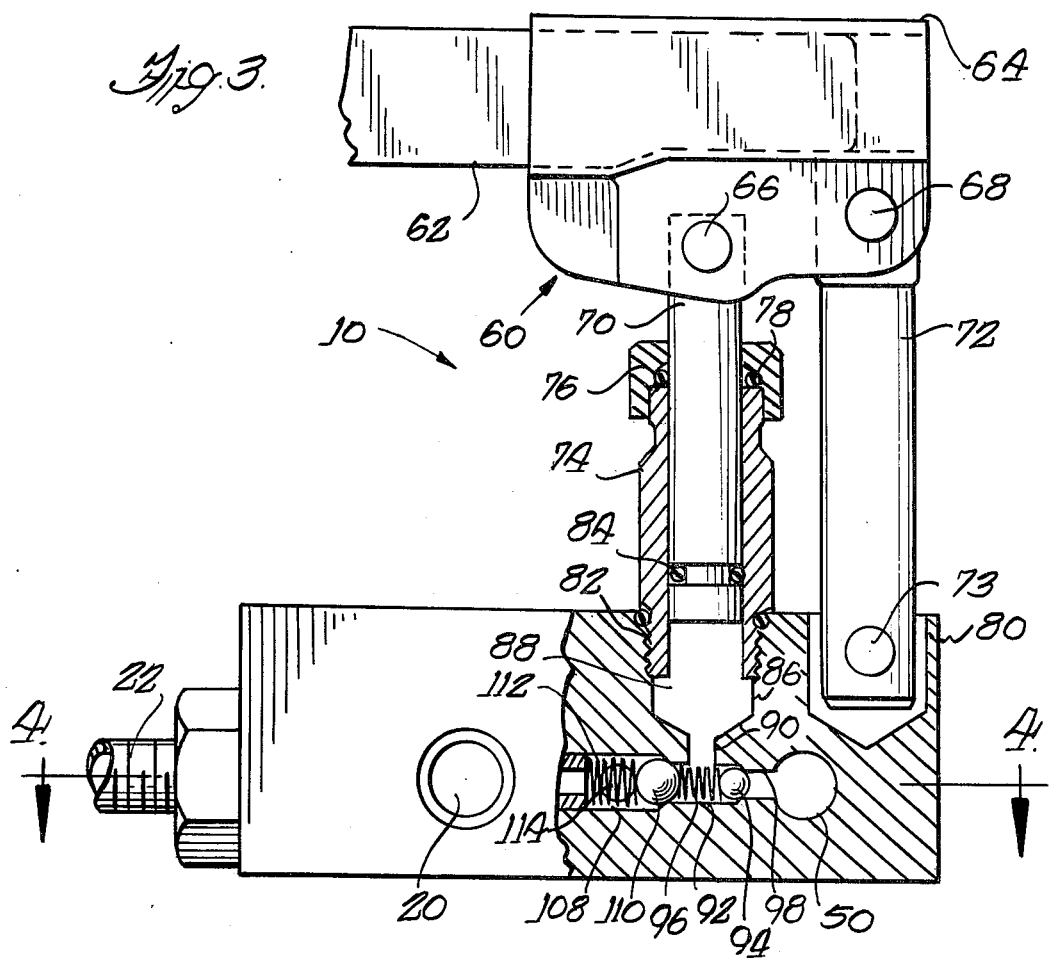
FIG. 3 is a side elevational view, partially cut away, of an auxiliary brake release apparatus including features of the present invention.
Figure 4:
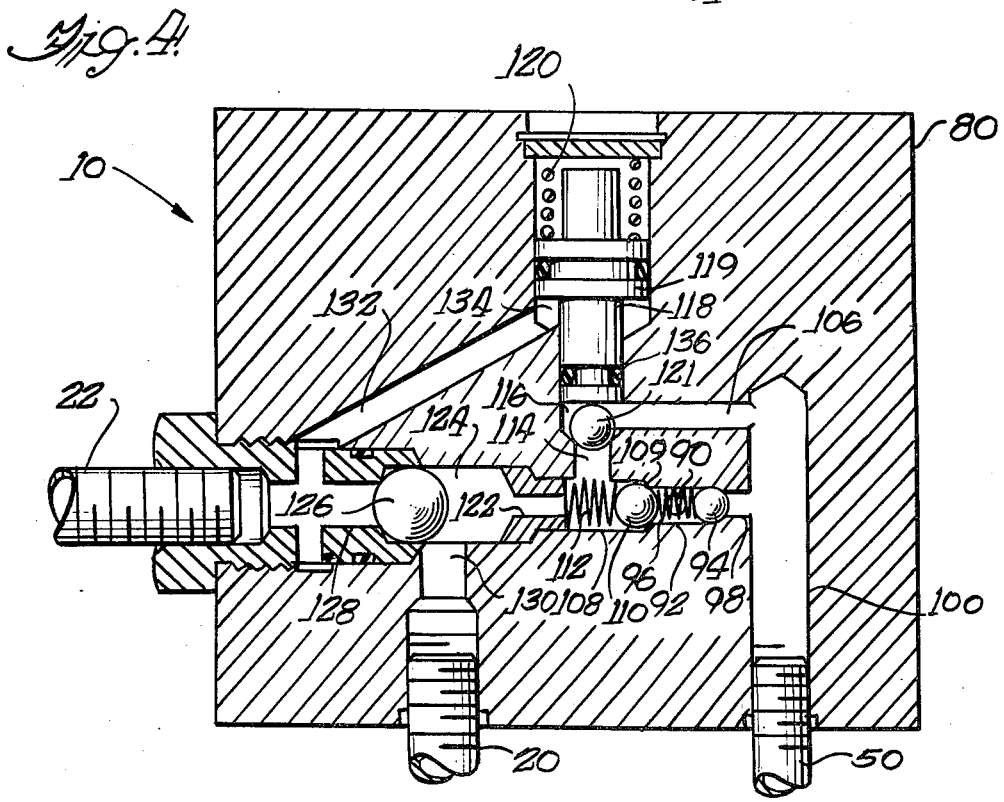
FIG. 4 is a sectional view taken at section 4—4 of FIG. 3, showing additional details of the apparatus of FIG. 3.

Turning now to FIGS. 3 and 4, the construction and operation of the auxiliary brake release apparatus 10 is shown in greater detail. The apparatus comprises hand pump 60 including a handle 62 connected to a housing 64 which is, in turn, pivotally connected by pins 66 and 68 to piston or plunger 70 and fixed link 72, respectively. Link 72 is connected by pin 73 to a body portion 80 of the apparatus 10. Piston 70 is disposed in a cylinder 74 which is sealed against fluid leakage therefrom by suitable means such as cap member 76 and O-ring 78 and is connected to the body 80 of the apparatus 10 by suitable means such as threads 82 engaging a complementary threaded opening in the body 80. The piston 70 is reciprocal within cylinder 74 and is additionally sealed against fluid leakage by a ring 84 disposed around its lower portion.

The cylinder 74 and piston 70 cooperate with a chamber 86 in the block 80 to define a pump chamber 88. Pump chamber 88 is connected by a port or opening 90 to a first valve chamber 92 formed in the block 80. The first valve chamber 92 is provided with a spring loaded ball valve comprising ball 94 and spring 96. The spring 96 serves to urge the ball 94 against a port or opening 98. The opening 98 communicates with a passageway 100 which is in turn connected by suitable means to fluid line 50, the line from the reservoir 30. The first valve chamber 92 has its end opposite intake passageway 100 connected to a second valve chamber 108 by a port 109 which is normally closed by a valve comprising a ball 110 and a spring 112 which urges ball 110 against port 109. Second valve chamber 108 is also connected to a port or opening 114 to a relief chamber 116. A piston 118 is normally urged by a spring 120 into engagement with a ball 121 to close the opening 114. Relief chamber 116 also is connected to an end of a passageway 106 whose other end is connected to the passageway 100, described above. Second valve chamber 108 is connected by a passageway 122 with a chamber 124 containing a ball 126 to form a shuttle ball valve. The shuttle valve chamber 124 is connected to a chamber 128 which is in turn connected to the fluid line 22 from a principal source of hydraulic pressure such as the pump 34 of FIG. 2. Chamber 124 is also connected to a passageway 130 which is in turn connected by fluid line 20 to the brake 14 of FIG. 2. A passageway 132 connects chamber 128 at the inlet from the principal source of hydraulic pressure to a second relief chamber 134 formed around the piston 118 below a portion 119 thereof of increased diameter somewhat above the first relief chamber 116 and separated therefrom by the body of the piston 118 and a sealing ring 136.

It will be noted that the above described structure may be formed in a single block of material 80 by drilling or otherwise forming a number of generally cylindrical bores or openings therein, inserting balls and springs as described to form the various valves, and providing a number of appropriately shaped and bored plugs to modify the size and shape of the openings to define the drscribed chambers and passageways. Also, the various fluid lines connected to the block 80, such as 20, 22 and 50 may be connected in any one of a number of known fashions ad need not be described further herein.

Having shown and described an embodiment of an apparatus according to the present invention, it is advantageous now to provide a description of the operation thereof.

As the pump handle 62 is raised, the piston 70 connected thereto by housing 64 and pin 66 is also raised. The piston 70 thus retracts or rises upwardly in the piston chamber 88 and draws open ball valve 94 against spring 96 thereby drawing fluid from the reservoir 30 through fluid line 50, passageway 100 and connecting port 98 into both valve chamber 92 and pump chamber 88. On the downward stroke of the handle 62, the fluid drawn into pump chamber 88 and valve chamber 92 has pressure applied to it by the piston 70 and thus causes ball valve 94 to again be urged by spring 92 into opening 98 to seal off the opening to the reservoir. At the same time, the fluid is forced against ball 110 which is forced open against spring 112 thereby and allows fluid to enter valve chamber 108 and flow therethrough to passageway 122. If there is no hydraulic pressure in line 22 from the principal source of pressure such as pump 34 of FIG. 2, the fluid in chamber 122 will force shuttle valve ball 126 across its chamber 124 and against the opening to chamber 128, thus opening chamber 124 and passageway 130 to the flow of fluid from passageway 122. With continued pumping of the handle 62 and piston 70, additional fluid will be drawn into the pump chamber 88 and forced into the shuttle valve chamber and chamber 130 as described above. Passageway 130 is provided with a connection to line 20 to the brake. Therefore, continued pumping will provide fluid under pressure to release the brake 14 of FIG. 2.

Ball 121 normally is urged against the port or opening 114 between chamber 108 and chamber 116 by piston 118 which is in turn urged against ball 121 by spring 120. The spring 120 is chosen to allow the piston 118 to raise allowing ball 121 below the piston to clear port 114 when the fluid pressure on ball 121 exceeds a predetermined pressure, which is chosen below the pressure rating of the brake. Thus, a relief valve is formed having a relief pressure set by the choice of spring 120 to avoid damage to the brake by the build-up of pressure accompanying continued pumping of the handle 62 and piston 70. As a specific example, to which no limitation is intended, the pressure rating of the brake may be on the order of 3,000 psi and the spring 120 may be chosen so that the relief pressure at port 114 on the ball 121 is on the order of 774 psi. Thus, as the pressure of the fluid in the brake approaches 774 psi, the pressure of the fluid at port 114, will also approach 774 psi, as port 114 is connected to the brake via chamber 108, passageway 122, chamber 124 and passageway 130. Consequently, continued pumping of the handle 62 and piston 70 will cause the pressure to exceed the preset relief pressure and open the relief valve comprising ball 121, piston 118 and spring 120. The open relief valve allows excess fluid to return to the reservoir 30 through passageway 106 connected to relief chamber 116, the passageway 100, and connecting line 50. When the pressure has once again dropped below the relief pressure, the spring 120 will again cause the piston 118 to seat the ball 121 closing the opening 114. Thus, the pressure to the brake is always held below the relief pressure set by spring 120.

When the principal source of hydraulic pressure such as the pump 34 is in operation, the auxiliary pressure source is removed from the system and the pressure in the auxiliary source is relieved as follows. Fluid under pressure enters chamber 128 from the the pump 34 through connecting line 22. The fluid under pressure also enters passageway 132 and a second relief chamber 134 formed below portion 119 of the piston 118 which is larger in diameter than the relief port or opening 114. Thus, a pressure smaller than the relief pressure hereinbefore described applied at the chamber 134 will urge the piston 118 against the spring 120, thereby relieving the pressure of the piston 118 on the ball 121. Therefore, the pressure from the pump 34 will cause the ball 121 to again open the relief port 114 and return fluid via passageways 106 and 100 and connecting line 50 back to the reservoir 30. Thus, the pressure from the hand pump will rapidly drop to substantially zero. The pressure from the principal source or pump 34 in the chamber 128 will then urge the shuttle valve ball 126 across the chamber 124 to close off the chamber 122, leaving chamber 128 directly in contact with chamber 124 and chamber 130. In this way, the hydraulic fluid from the pump 34 is once again in direct contact through connecting lines 22 and 20 to the brake 14, to resume normal operation. As a specific example, to which no limitation is intended, the pressure from the pump 34 necessary in chamber 134 to raise the piston 118 in the above-described manner is on the order of 115 psi.

While a specific embodiment has beeb shown and described herein, various changes and modifications therein will occur to those skilled in the art, and are to be understood as forming a part of the present invention insofar as they fall within the spirit and scope of the appended claims.

The invention is claimed as follows:

1. In combination with a normally activated hydraulic pressure releasable brake having a principal source of hydraulic pressure: an auxiliary source of hydraulic pressure, a first valve means resposive to said principal source and to said auxiliary source and coupled with said brake for allowing said auxiliary source to feed the brake and simultaneously disconnecting said principal source from the brake when the principal source is not delivering pressure to the first valve means and for disconnecting the auxiliary source of pressure from the brake and allowing the principal source of pressure to feed the brake when the principal source of pressure is delivering pressure to the first valve means and the auxiliary source is not delivering pressure thereto, and relief valve means responsive to said principal source of pressure for relieving said auxiliary source of pressure so as not to deliver pressure to the first valve means when said principal source of pressure is delivering fluid to said relief valve at a predetermined minimum pressure.

2. The combination of claim 1 wherein said auxiliary source of hydraulic pressure comprises a hand operable pump including a cylinder and a piston disposed in the cylinder, a supply of fluid, and means for connecting said supply of fluid to said cylinder to feed fluid thereto when said hand pump is operated.

3. The combination of claim 2 wherein said relief valve means is disposed for returning fluid from said cylinder to said supply of fluid when said principal source of hydraulic pressure is delivering said predetermined minimum pressure thereto.

4. The combination of claim 3 wherein said relief valve means is further responsive to said auxiliary source of pressure for limiting the amount of pressure applied to the brake from the auxiliary source of pressure to a predetermined maximum, by returning fluid from said cylinder to said supply of fluid when said auxiliary source of hydraulic pressure exceeds said predetermined maximum pressure.

5. An auxiliary brake release apparatus for use with a hydraulic pressure releasable brake having a principal source of hydraulic pressure and comprising: an auxiliary souce of hydraulic pressure, first valve means resposive to said principal source and to said auxiliary source for connecting said auxiliary source to feed the brake and simultaneously disconnecting said principal source from the brake when the principal source of pressure is not belivering pressure to the first valve means and the auxiliary source is delivering pressure thereto and for disconnecting the auxiliary source from the brake and connecting the principle source of pressure to feed the brake when the principal source of pressure is delivering pressure to the first valve means and the auxiliary souce is not delivering pressure thereto, and pressure relief valve means responsive to said principal source of pressure for relieving the pressure delivered from said auxiliary source of pressure to the first valve when the principal source is delivering a predetermined minimum pressure to said relief valve means.

6. The apparatus of claim 5, wherein said pressure relief valve means is further responsive to said auxiliary source for limiting the amount of pressure provided to the brake from the auxiliary source of pressure to a predetermined maximum.

7. The apparatus of claim 6 wherein said auxiliary source of hydraulic pressure comprises a cylinder, a hand-operable handle and a piston connected to the handle and disposed for reciprocal movement in the cylinder, a supply of fluid and means for connecting said supply of fluid to said cylinder.

8. The apparatus of claim 7 wherein said pressure relief valve means is connected to said supply of fluid and to said cylinder for returning fluid from said cylinder to said supply of fluid when said auxiliary source of hydraulic pressure exceeds said predetermined maximum pressure and for returning fluid from said cylinder to said supply of fluid when said principal source of hydraulic pressure is delivering said predetermined minimum pressure.

9. The apparatus of claim 8 wherein said first valve means comprises a shuttle valve including a chamber connected to said auxiliary source of pressure, to said principal source of pressure and to the brake and a ball movable in said chamber.

10. The apparatus of claim 9 wherein said relief valve includes a first relief chamber coupled to the principal source to respond to pressure from said principal source of pressure and a second relief chamber coupled to said auxiliary source to respond to pressure from said auxiliary source.

* * * * *